Figure 17:
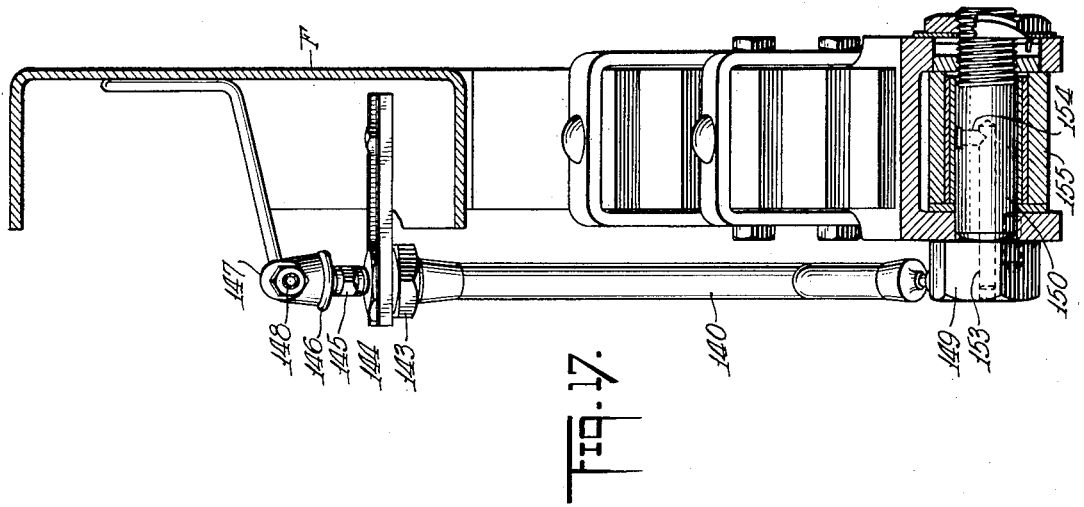

Sept. 26, 1933.    J. BIJUR    1,927,914
LUBRICATION
Filed May 23, 1929    5 Sheets-Sheet 1
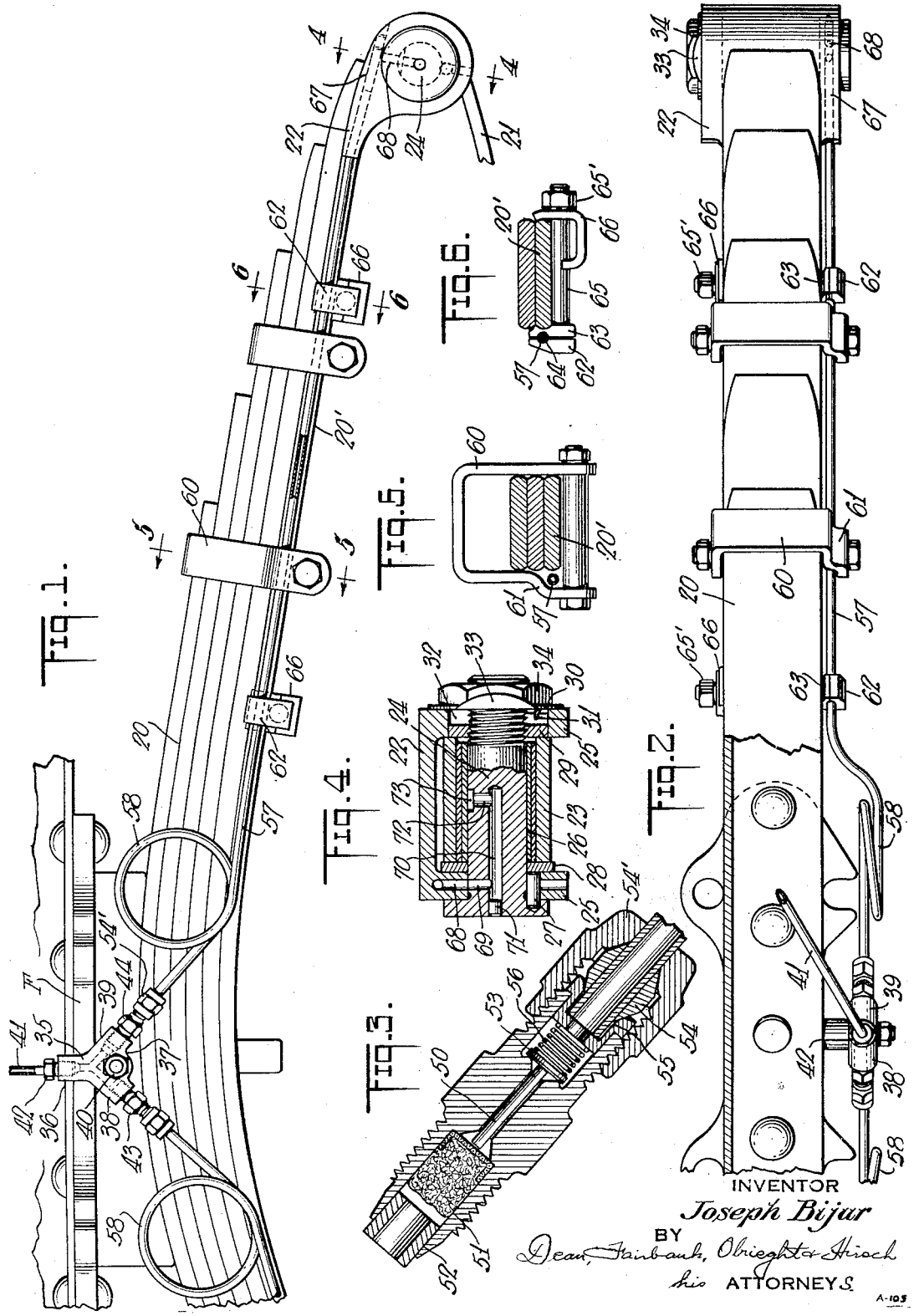

Sept. 26, 1933.        J. BIJUR        1,927,914
LUBRICATION
Filed May 23, 1929    5 Sheets-Sheet 2
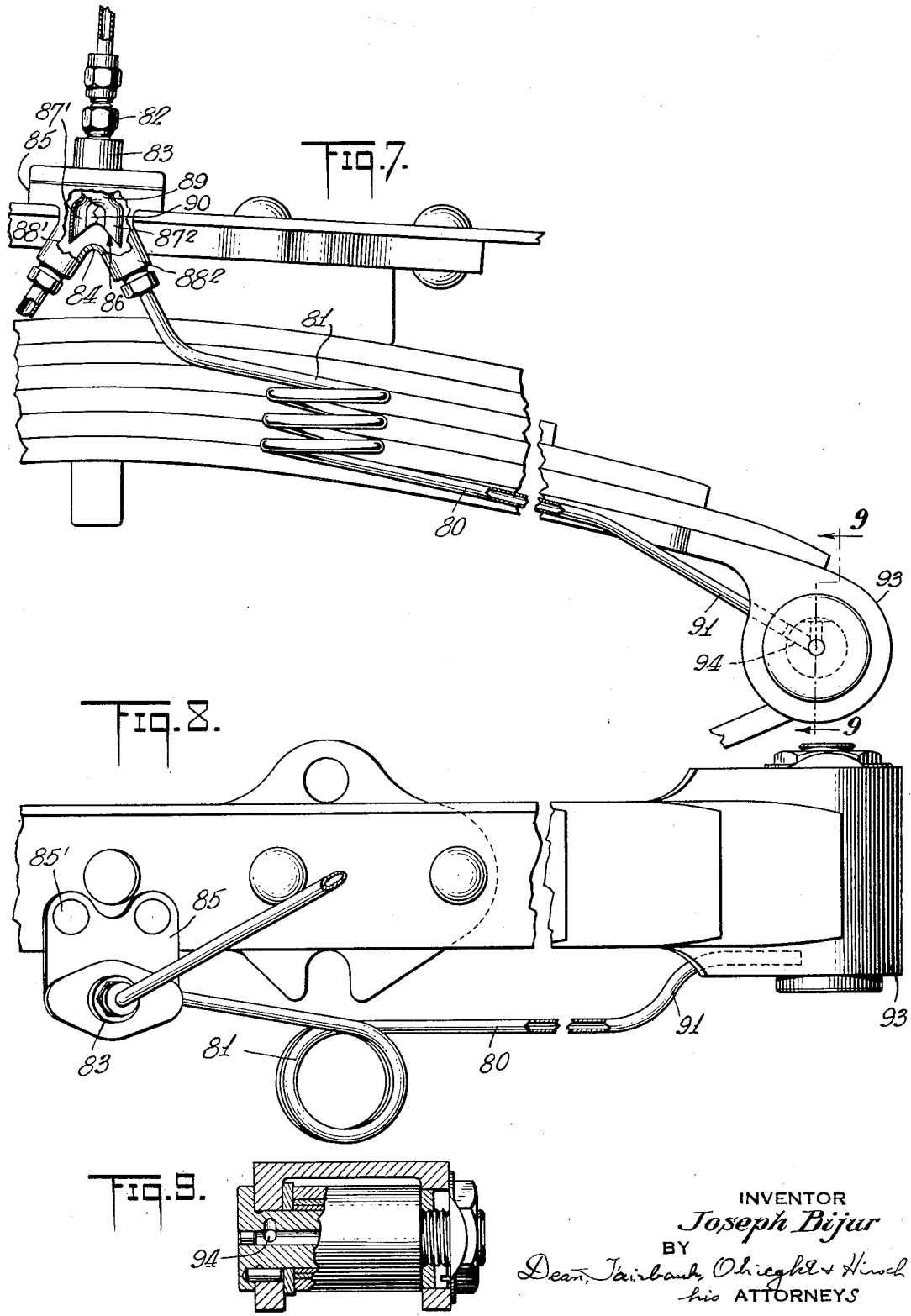
INVENTOR
*Joseph Bijur*
BY
Dean, Fairbank, Obright & Hirsch
his ATTORNEYS Sept. 26, 1933.     J. BIJUR     1,927,914
LUBRICATION
Filed May 23, 1929     5 Sheets-Sheet 3
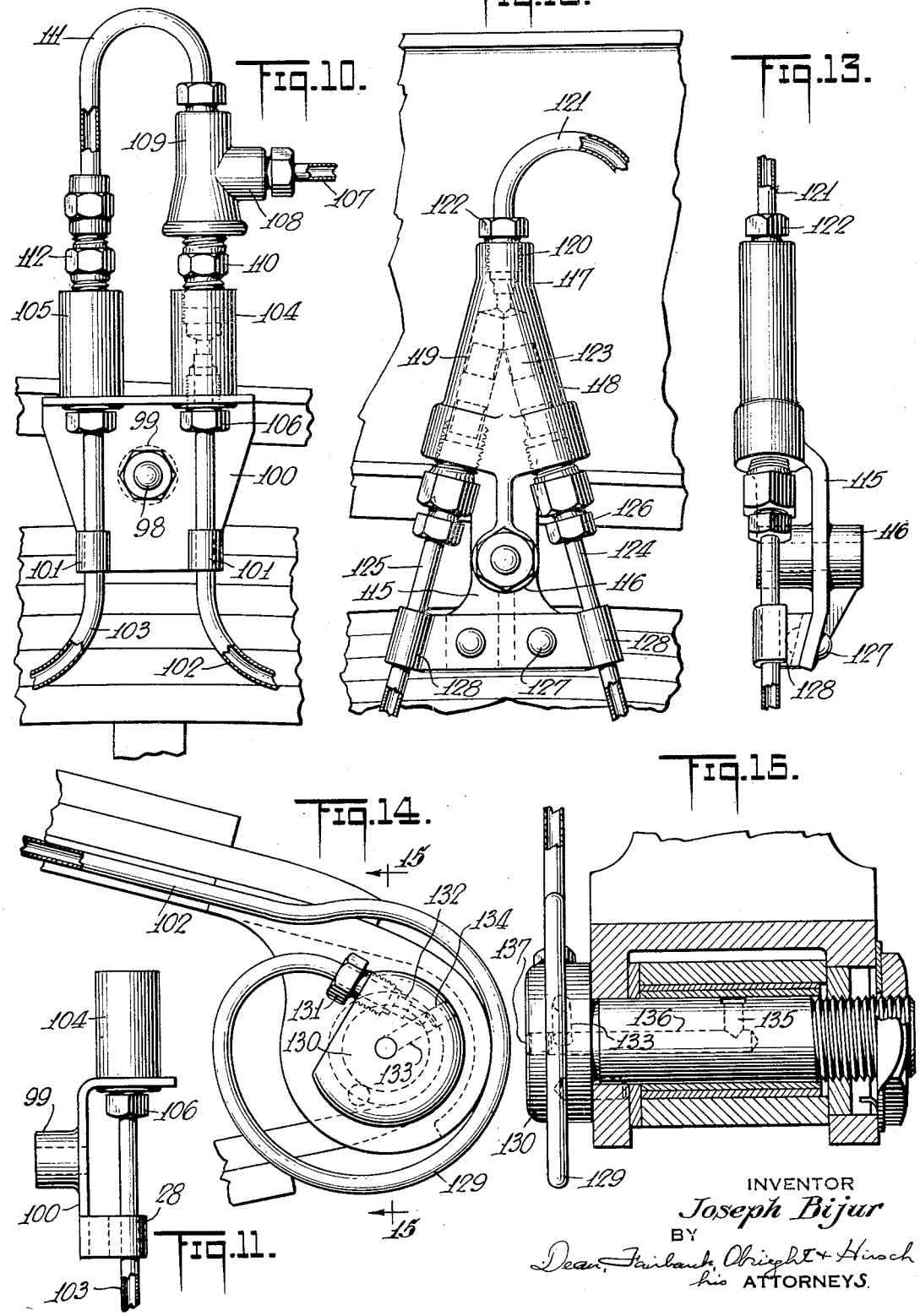

Sept. 26, 1933.    J. BIJUR    1,927,914
LUBRICATION
Filed May 23, 1929    5 Sheets-Sheet 4

INVENTOR
Joseph Bijur
BY
Dean, Fairbank, Obright & Hirsch
his ATTORNEYS.

Sept. 26, 1933.   J. BIJUR   1,927,914
LUBRICATION
Filed May 23, 1929   5 Sheets-Sheet 5
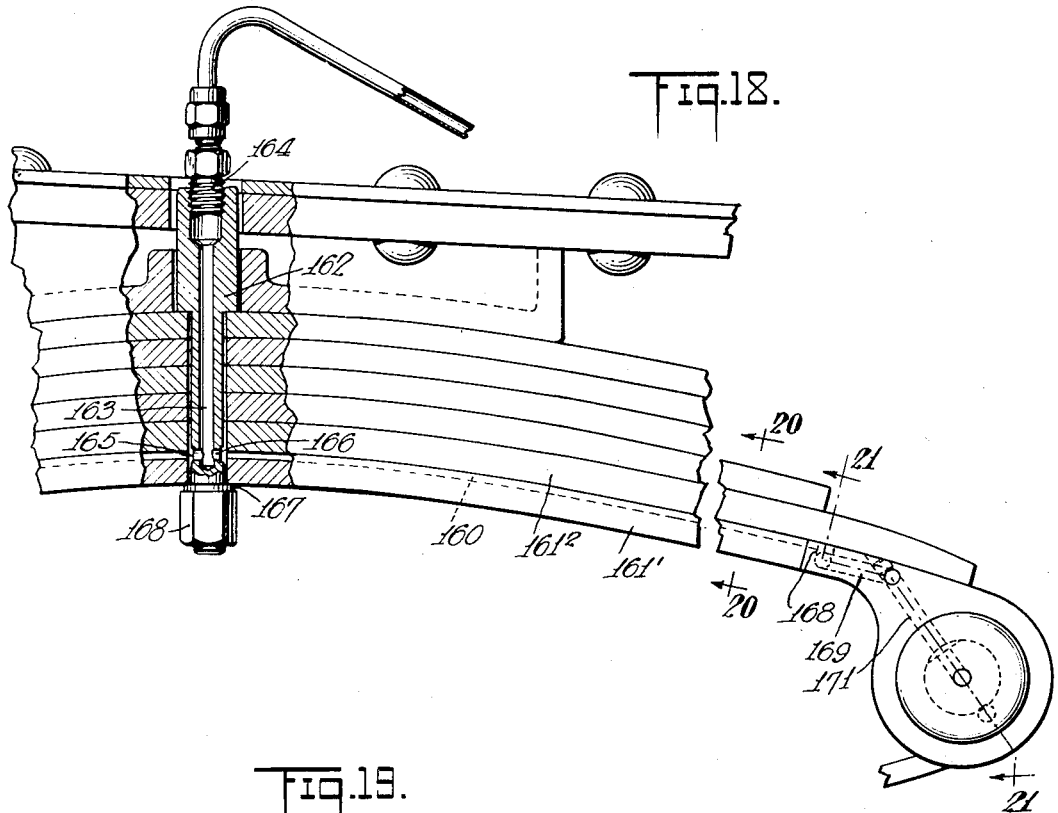
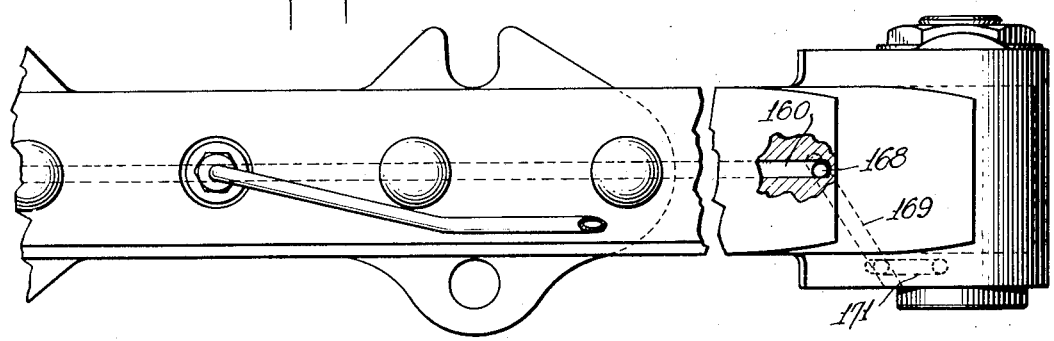
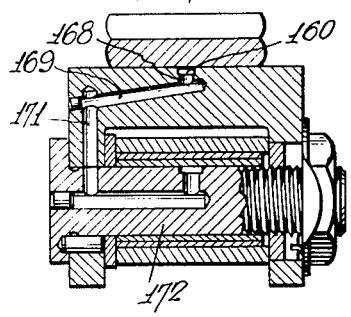
INVENTOR
*Joseph Bijur*
BY
his ATTORNEY Patented Sept. 26, 1933

1,927,914

UNITED STATES PATENT OFFICE 1,927,914

LUBRICATION

Joseph Bijur, New York, N. Y., assignor to Auto Research Corporation, a corporation of Delaware Application May 23, 1929. Serial No. 365,260

26 Claims. (Cl. 184—7)

My present invention is concerned with central lubrication and with lubrication of bearings, such as bolt bearings and in its most specific application with the lubrication of the pivot bearings between the two extremities of the constituent spring elements of a full elliptic vehicle spring, and more especially with the delivery of lubricant to said bearings from a central source on the spring supported part of the vehicle.

The admission of lubricant to the pivot bearings of a semi-elliptic spring does not involve accommodation of movement relative to the frame. With a full elliptic or other compound spring, however, account must be taken of the fact that the pivot bearings between the two spring extremities are themselves movable both with respect to the frame and with respect to the axle of the vehicle.

It is an object of the invention to lubricate the pivot bearings of full elliptic springs without resort to vulnerable conduits for bridging the gap, or the use of protruding parts apt to be broken off, or the loss of lubricant in the course of flow to the bearings or the entry of dust, dirt or water thereto.

Other objects will be in part obvious during the course of the following specification and will be in part pointed out therein.

It is a feature of the invention to deliver lubricant from the saddle of one of the semi-elliptic spring elements, preferably the upper one, longitudinally along the respective segments of said spring element, through passageways or conduits flexing therewith, each of said conduits delivering at its extremity into a part preferably fixed with respect to the corresponding spring end and feeding to the pivot bearing thereat preferably by overflow from the upper part of the pivot bolt. Where such upper face presents the loaded side of the bearing, the lubricant is thus delivered where it is desired, and where the loaded face is at the lower part of the bolt, the lubricant will drain downward by gravity from the upper part about the bolt to the wear surface where it is wanted.

The lubricant may be admitted to the bolt from the bearing yoke therefor, by flow across the loaded side thereof into the bolt, which is preferably keyed with respect to the yoke.

In another type of construction, the flexible conduit may be applied to the head of the bolt, without passing lubricant through the yoke. Where a seamless metal tube is employed, the end thereof may be coiled once or twice about the bolt head, to accommodate relative movement.

The lubricant inlet may be a Y fitting to the upstanding stem of which lubricant is admitted and from the diverging arms of which lubricant passes to flexible conduits which may be seamless metal pipes extending along the spring segments. The division between the pipes may be effected by in any suitable manner as separate drip plugs in the respective arms, or alternatively by a gravity dividing drip nozzle supplied from a single drip plug in the stem of the Y fitting.

In another embodiment the lubricant may be passed longitudinally of the saddle bolt of the upper spring element, into a groove along the longest or lowermost of the spring leaves to the bearings at the extremities thereof.

Figure 16:
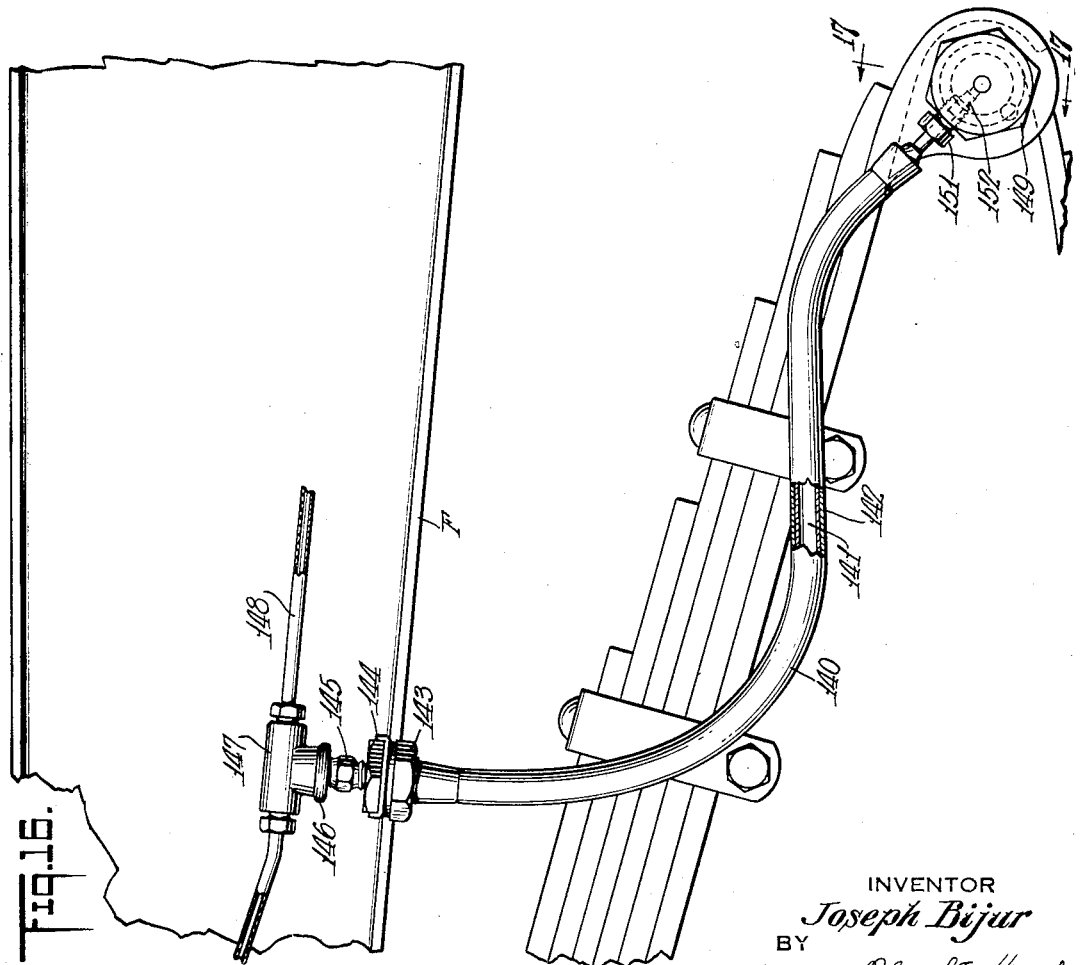

In the accompanying drawings in which are shown one or more of various possible embodiments of the several features of the invention, Fig. 1 is a fragmentary view in side elevation showing one embodiment of the invention, Fig. 2 is a fragmentary plan view of the embodiment of Fig. 1, Fig. 3 is a sectional view on a larger scale of one of the drip plug inlets, Figs. 4, 5 and 6 are sectional views taken respectively along the lines 4—4, 5—5 and 6—6 of Fig. 1, Fig. 7 is a fragmentary side elevation of a modified form of the invention showing parts broken away, Fig. 8 is a fragmentary plan view thereof, Fig. 9 is a transverse sectional view on line 9—9 of Fig. 7, Fig. 10 is a side elevation of the inlet part of another embodiment, Fig. 11 is a side elevation of the bracket of Fig. 10, Fig. 12 is a view similar to Fig. 10 of another embodiment, Fig. 13 is a view similar to Fig. 11 of the embodiment of Fig. 12, Fig. 14 is a side elevation of the outlet or delivery end of another arrangement of conduit, Fig. 15 is a transverse sectional view on line 15—15 of Fig. 14, Fig. 16 is a side elevation of another embodiment of pivot bolt lubricator, Fig. 17 is a fragmentary view in section on line 17—17 of Fig. 16, Fig. 18 is a view similar to Fig. 7 of a further embodiment, Fig. 19 is a fragmentary plan view of one end thereof, Fig. 20 is a cross-sectional view on line 20—20 of Fig. 18, and Fig. 21 is a cross-sectional view on line 21—21 of Fig. 18.

In Figs. 1 to 6 of the drawings is shown a full elliptic vehicle spring comprising an upper leaf spring element 20, and a lower leaf spring element 21, the latter anchored between its ends to the axle, and the former to the vehicle frame F. In the more or less conventional form of full elliptic spring shown, the upper spring is provided with a bifurcated yoke terminal 22 welded to the lower or longest leaf 20' thereof, and straddling the eye 23 of the lower spring element 21. A bolt 24 transversely through eyes 25 in the yoke and through the spring eye 23 affords a bearing for the latter, which preferably has a bearing bushing 26 therein. The bolt 24 is preferably keyed by means of a dowel pin 27 in the yoke 22, so that it affords a relatively fixed support for the bushing 26 which rocks thereon. The said bearing preferably includes a lateral take-up comprising a metal washer 28 against one of the arms of the yoke, and a take-up nut 29 threaded upon the bolt and disposed in the eye 25 of the other yoke arm. The spring eye is thus retained against rattle between washer 28 and nut 29. A lock washer 30 has an inturned tongue 31 extending into a diametral slot 32 in the nut 29 and out-turned at 33 against one of the sides of the hexagonal nut 34, which is threaded upon the extremity of the bolt 24, to maintain the parts assembled.

To convey lubricant to the bushings at the extremities of the spring, I provide at the frame an inlet fitting 35 which may be a Y fitting with an upstanding stem 36, and which may have a web 37 transversely between its arms 38 and 39, at which it is affixed to the frame, by means of a bolt 40. The conduit 41 from the central source of lubricant supply is fixed to the stem of the inlet by means of a compression coupling 42. Flow controlling or drip plug outlets 43, 44 preferably of the reverse feed type are fixed in the arms of the Y fitting and respond to pressure to convey lubricant to the corresponding extremities of the spring.

One of these drip plugs is shown in detail in Fig. 3 and will be but briefly described, since the details of construction thereof are not material to the invention herein claimed. The drip plug is screwed into the Y fitting and has a restriction pin 50 in a corresponding bore between the ends thereof, and a strainer wad 51 in the base end thereof, maintained in position by means of a sleeve 52 secured therein. At the outer end of the drip plug there may be a relief valve 53. The compression sleeve 54 that secures the inlet pipe to the drip plug, where nut 54' is tightened, reacts against a hard metal collar 55, which serves also as the reaction piece for the valve seating spring 56.

The lubricant conduit which preferably extends lengthwise of the spring to flex therewith is shown as a length of seamless metal tubing 57 provided with an extra turn 58 contiguous to the drip plug, to afford localized flexibility for accommodating most of the relative movement. The conduit preferably extends through a gap between the spring leaves and the spring leaf clips 60, the latter being offset slightly at 61 to afford such clearance. Instead of or in addition to passing through the spring clips the conduit may be anchored at the leaf spring 20', by clamps each comprising a pair of jaw plates 62 and 63 affording semi-cylindrical grooves 64 for gripping the tube 57 therebetween. The outer of the jaw plates 62 is preferably formed as an integral part of a bolt 65 extending through the complementary clip piece 63. An L-shaped reaction piece 66 at the opposite edge of the spring straddles the bolt 65 and is clamped against the spring and the bolt, by means of a nut 65' threaded upon the extremity of the bolt. Thus the bolt and the clamp clasp the lower leaf of the spring and the tightening of the nut 65' also closes the conduit gripping clamp.

The extremity of the tube 57 extends into a corresponding longitudinal bore 67 through the base of the yoke 22, into which it may also be soldered. The bore 67 extends beyond the pipe end and delivers into a shorter bore 68 radially of the yoke eye 25, from which it delivers into a registering bore 69 radially of the bolt 24. The bore 69 communicates with an axial bore 70 in the bolt, which bore is plugged at its outer end at 71 and in turn delivers by overflow to an upwardly directed radial bore 72 terminating in a flat 73 on the bolt at the upper part of the spring eye bushing 26.

By the construction shown, lubricant is thus reliably delivered without leak to the place required. It will be noted that the yoke 22 rests upon the bolt 24 so that the passage of lubricant through bore 68 to bore 69 is across a loaded surface, whereby leak is avoided. Moreover the outlet from the bore 72 being at the uppermost part of the rocking bushing, the overflow therefrom about the bolt will cause the lubricant to deposit at the place where it is needed that is, at the lower and loaded part of the bushing eye, 23.

In the embodiment of Figs. 7 to 9, the flexible conduit 80 extends from its inlet end free from contact with the spring throughout the entire length thereof, the conduit being preferably of sufficient stiffness to avoid whipping and being formed with three or four helical turns 81 near its anchored end to accommodate upward and downward movement of the outer end thereof. In the present embodiment, there is illustratively shown but a single drip plug 82, for supplying lubricant to the bolts at both extremities of the spring. This drip plug is disposed at the inlet stem 83 of a dividing or Y fitting 84 protruding outward from the frame to which it is secured by means of a ledge piece 85 fixed upon the frame by bolts 85'. The drip plug may be of the type shown in my prior Patent No. 1,632,772 of July 14, 1927, but other metering devices may also be used.

Division of lubricant to the bearings at the opposite ends of the spring is effected by means of a dividing gravity feed 86 having a bifurcated outlet with nozzles 87' and 87² dripping respectively into arm 88' and 88² of the dividing fitting. The dividing gravity feed preferably comprises a pipe end 89 supplied from the drip plug 82 and flattened at its outlet extremity 90 to afford a curved barrier between the drip nozzle outlets 87' and 87².

The outlet end of the distributing conduit 80 is illustratively bent obliquely downward at 91 to feed laterally and downward into the yoke eye 93 from which it delivers into the radial bore 94 of the bolt. The rest of the construction is similar to that of Fig. 1 and is therefore not shown or described.

In Figs. 10 and 11 is shown a fragmentary view of another lubricant inlet to a spring of the character set forth. In this embodiment a bracket 100 is secured above the upper spring at the saddle thereof by means of a screw 98 through a boss 99 and has inturned loops 101 accommodating the upstanding ends of feed pipes 102 and 103 that lead along the spring. A pair of mounting collars 104 and 105 are secured upon the bracket and rise from above the channel frame and mount compression couplings 106 at the lower ends thereof to secure the pipes 102 and 103 in position. Lubricant is admitted from the supply pipe 107 by securing the latter in the stem 108 of a T fitting 109 one of the arms of which is threaded upon a drip plug 110 secured in the upper end of collar 104. The other arm of the T fitting 109 is connected by means of a loop pipe 111 with a second drip plug 112 applied into the outer end of the mounting collar 105. Obviously pressure applied through pipe 107 will effect division of lubricant through the drip plugs 110 and 112 into the respective feed pipe ends.

Another lubricant inlet construction is shown in Figs. 12 and 13. It comprises a casting or forging 115 having a mounting hub 116 near the lower end thereof by means of which it is affixed to the chassis frame. The unit 115 also has an inverted V shaped upper end with converging bores 118 and 119 therein merging into an apical bore 120 at which the inlet pipe 121 is affixed by means of a compression coupling 122. In the bores 118 and 119 are lodged drip plugs 123 illustratively of cartridge form, such for instance as shown in my British Patent No. 261,967. To the lower extremities of the bores 118, 119 are affixed the feed pipes 124 and 125 leading to the opposite extremities of the spring and these are affixed in position by compression couplings 126. If desired, the lower extremity of the unit 115 may have riveted thereto as at 127 a pair of guide clips 128 which retain the outlet ends of the feed pipes.

In Figs. 14 and 15 is shown a means alternative to that of Figs. 1, 2 and 3 for admission of lubricant to the spring bolt pivot. The extremity of the feed pipe 102 is looped once in a spiral loop 129 about the bolt head 130 and its extremity is applied to the bolt head by means of a compression coupling 131. The outlet end of the pipe bore 132 that mounts coupling 131 feeds into a radial bore 133 in the bolt head plugged at its outer end at 134 and said bore in turn communicates with an axial bore 136 plugged at its outer end at 137, the latter bore overflowing preferably through an upwardly extending radial bore 135 in the bolt, as in the other embodiment.

In the embodiment of Figs. 16 and 17 is shown an arrangement for feeding lubricant from the frame to the pivot bolt at the end of the spring by means of a flexible hose 140 which may be of any suitable construction, but preferably comprises a canvas liner 141 with a rubber body 142. The upper end of the hose is coupled by means of nuts 143 and 144 to the channel frame F and nut 144 carries an upstanding drip plug 145 which in turn carries the stem 146 of a T fitting 147 to the arms of which the main length of supply conduit 148 is affixed. The flexible hose 140 extends in a general S shape downward preferably to the head 149 of the bolt 150 to which it is applied by means of a compression coupling 151. The outlet of the conduit 140 feeds through a radial bore 152 in the bolt head 149, and thence by way of a longitudinal bore 153 and a radial bore 154 to the bearing surface of the spring eye 155, as in the embodiment of Fig. 1. A similar hose is of course used for feeding the opposite pivot bolt (not shown) in similar manner.

It will be understood of course that substantially any of the various spring lubrication inlets in various embodiments shown may be used interchangeably with any of the various spring pivot outlet constructions shown.

In the embodiment of Figs. 18 to 21, flexible pipes are dispensed with and the lubricant is conveyed lengthwise of the vehicle spring to the bolt by way of a longitudinal groove 160 formed preferably in the lowermost or longest of the spring leaves $161^1$, and closed by the flat spring $161^2$ immediately thereabove to form an elongated lubricant-conveying passageway. Lubricant is admitted to the passageway 160 through the anchoring bolt 162 at the spring saddle. Said anchoring bolt has a longitudinal bore 163 therein supplied from a drip plug 164 which is affixed at the outer or inlet end thereof. The bolt has a peripheral groove 165 in the plane of the longitudinal groove 160 and supplied from the axial bore 163 by way of a radial bore 166. Preferably a gasket 167 about the lower end of the bolt is pressed in place by means of the nut 168 and prevents the leak of lubricant from about the bolt, so that lubricant admitted through drip plug 164 will pass through the bolt 162 and by way of radial groove 166 and peripheral groove 165 lengthwise of the spring groove 160. Spring groove 160 delivers into a corresponding short bore 168 at the end of the yoke which in turn communicates with a transverse bore 169 in the base of the yoke. The latter bore 169 delivers into a bore 171 radially of the yoke eye to feed to the bolt 172 in the manner described in connection with Figs. 1 to 6.

Preferably the spring saddle bolt has some clearance with respect to the leaves through which it passes so that lubricant may rise along the surface of the bolt, and seep to a degree between the leaves of the spring, thereby effecting lubrication of the spring leaves near the middles thereof.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

Although the present invention has been specifically illustrated in its application to the bearings of springs, particularly the hinge bearings of full elliptic springs, it is to be understood that the inventive features of the present application as set forth in the accompanying claims may also be utilized in the lubrication of bearings other than spring bearings or chassis bearings.

It is obvious, of course, that the distributing lubricant system shown on the spring might be fed from other than a drip plug, as shown in Figs. 1, 2, 7, 10, 12, 13, 16, 17 and 18. Other flow proportioning devices might be utilized or the lubricant might be directly introduced into the inlet without utilizing a central lubricating installation. It is obvious that the lubricating installation shown might be applied to other than spring bearings, as for example to other chassis bearings or to mechanism bearings in general.

Having thus described my invention, what

I claim as new and desire to secure by Letters Patent of the United States is:—

1. In a full elliptic spring of the type comprising an upper leaf spring, a lower leaf spring, one of said springs having a yoke at its end straddling the end of the other and a bolt through said yoke affording a bearing for the relative rocking movement of the two springs; the combination of means for applying lubricant to said bolt, said means comprising a lubricant inlet extending through one of the arms of the yoke into the bolt, a passage along the bolt to the bearing surface thereof and a conduit along one of said springs to said inlet.

2. In a vehicle spring construction of the type comprising a lower leaf spring having an eye, an upper leaf having a yoke straddling said eye and a bolt affixed in said yoke and affording a bearing for said eye; the combination therewith of means for lubricating said bearing eye, said means comprising a lubricant inlet through said yoke extending through the loaded face of said bolt, said bolt affording a passage therethrough opening between the ends thereof into said eye and a conduit along one of said springs to said inlet.

3. In a full elliptic vehicle spring of the type comprising an upper leaf spring having a yoke at its extremity, a bolt keyed in said yoke serving as an inner bearing element, a lower leaf spring having an eye with a bearing bushing on said bolt serving as an outer bearing element and between the arms of said yoke; the combination therewith of means for lubricating said bearing, said means comprising a lubricant conduit extending from above said spring to one of the arms of said yoke, a bore through said yoke arm, a corresponding bore in the loaded side of said bolt registering with said first bore, said bolt having a longitudinal bore and a radial bore extending upward and delivering into the upper part of said bushing.

4. In a full elliptic vehicle spring of the type comprising an upper leaf spring having a yoke at each end, a lower leaf spring having an eye at each end, a bolt through each yoke and eye, keyed in the former and forming a bearing for the latter; the combination therewith of means for lubricating the bearing surfaces between the bolt and the eye, said means comprising a lubricant inlet above said spring and between the ends thereof, conduits extending from said inlet longitudinally of said upper leaf, the extremities of which are affixed in the respective yokes and bores from said yokes into the corresponding bolts longitudinally of the latter and outward to the upper parts of the spring eyes.

5. In a full elliptic vehicle spring of the type comprising an upper leaf and a lower leaf, the extremities of one of said leaves having yokes and the extremities of the other having eyes straddled by the respective yokes and bearing bolts affixed in said yokes, affording bearings for the respective eyes and keyed with respect to the corresponding yokes; the combination therewith of a lubricant inlet at each yoke, a conduit conveying lubricant from each yoke into the corresponding bolt across the loaded surface thereof, a bore longitudinally of each bolt and an outlet bore in each of said bolts delivering to the upper side of the corresponding eye and a conduit along said upper leaf to said inlet.

6. In a full elliptic vehicle spring of the type comprising an upper leaf spring having a yoke at each end, a lower leaf spring having an eye at each end, a bolt through the respective yokes and eyes keyed in the former and forming a bearing for the latter; the combination therewith of lubricant conduit means extending into each yoke, a bore from the yoke into the bolt at the loaded side of the latter, each of said bolts affording a passageway longitudinally thereof and having an outlet at the upper side of the corresponding eye and a conduit along said upper leaf to said inlet.

7. In a full elliptic vehicle spring, the combination of a pair of upper and lower spring leaves, one of said leaves having a yoke, the other having an eye straddled by said yoke and a bolt keyed in said yoke and affording a bearing with respect to said eye, means for feeding lubricant into said bolt from said yoke through the loaded surface thereof and delivering lubricant from said bolt to said eye at the upper part of the latter and a conduit along said upper leaf to said inlet.

8. In a saddled full elliptic vehicle spring provided with pivot pins, means for feeding lubricant to the pivot pins thereof, said means comprising a lubricant inlet at the saddle of one of said springs and means conveying the lubricant therefrom longitudinally outward from said inlet into the pivot pins at the extremities thereof, said pins delivering outward to the spring eyes thereabout and flow proportioning devices for causing appropriate division of lubricant to the two pins.

9. In combination with a full elliptic vehicle spring comprising a pair of upper and lower semi-elliptic spring elements, saddles for each element, pivot bolt connections between the respective ends of said springs, means for feeding lubricant to said pivot bolts from a central source, said means comprising a lubricant inlet at the upper saddle and flexible lubricant conduit means extending from said inlet longitudinally of the two halves of the upper spring and flexing therewith with outlet ends thereof fixed with respect to and delivering into passages in the respective pivot bolts and with said passages overflowing into the upper parts of the respective bolts.

10. In a full elliptic vehicle spring comprising a pair of upper and lower semi-elliptic spring elements, each having a saddle, pivot bolts connecting the extremities of the two spring elements, a lubricant inlet affixed with respect to the upper spring saddle, dividing means adjacent said inlet, a pair of flexible conduits delivering from the respective dividing means longitudinally of the upper spring to the respective pivot bolts, said conduits being constructed and arranged as to accommodate the flexibility of the vehicle spring.

11. A full elliptic vehicle spring comprising an upper leaf spring element, a lower leaf spring element and pivot bearings connecting the extremities thereof, each including a bearing element affixed with respect to the upper spring leaf for each of said spring elements, a Y lubricant inlet fitting, drip plug controls in the arms of said Y fitting, flexible conduits extending from said drip plug outlets longitudinally of the respective spring segments and connected at their outlet ends to those pivot elements fixed with respect to the upper spring segment and delivering thereinto, said flexible conduits being of seamless metal and having extra length to accommodate spring flexure.

12. A full elliptic vehicle spring comprising an upper leaf spring element, a lower leaf spring element and pivot bearings connecting the extremities thereof, one element of each of which is affixed with respect to the upper spring leaf, a saddle for each of said spring elements, a Y lubricant inlet fitting with an upstanding inlet stem, dividing means feeding through said stem into the respective arms of the fitting and flexible conduits extending from said arms longitudinally of the respective spring segments and connected at their outlet ends to those pivot elements fixed with respect to the upper spring segment and delivering thereinto, said flexible conduits being of seamless metal and having extra length to accommodate spring flexure.

13. A full elliptic vehicle spring comprising an upper leaf spring, a lower leaf spring and pivot bearings connecting the extremities thereof, each including a bearing element affixed with respect to the upper spring leaf, a saddle for each of said springs, a Y lubricant inlet fitting, a dividing gravity drip nozzle supplied from said inlet and dripping into the respective dividing legs of the fitting, flexible conduits extending from said legs longitudinally of the respective spring segments and connected at their outlet ends to those pivot elements fixed with respect to the upper spring segment and delivering thereinto, said flexible conduits being of seamless metal and having extra length to accommodate spring flexure.

14. In a vehicle spring having a plurality of leaves, the combination of a saddle between the ends thereof, a bolt through the saddle and through the leaves of said spring, a lubricant inlet in said bolt, a lubricant pasageway longitudinally of said bolt, a passageway longitudinally of and through one of said spring leaves to deliver lubricant from said bolt to the spring extremities, and means for passing lubricant from said bolt longitudinally into the contiguous bearing surface of the spring leaves with respect to each other.

15. In a full elliptic spring, the combination of means for feeding lubricant to the pivot bearing thereof, said means comprising an inlet near the middle of the spring, a seamless metal feed pipe extending lengthwise of the spring from the inlet to the pivot bearing, spring clips retaining the leaves of the spring together, said clips affording clearance for retaining the feed pipe in position.

16. In a full elliptic spring, means for feeding lubricant from the middle of the spring to one of the pivot bolts thereof, said means comprising a seamless metal feed pipe extending lengthwise of the spring, one or more clamps having jaws embracing the feed pipe and means separably clipping each of said clamps to one of the leaves of the spring.

17. In a full elliptic spring, means for feeding lubricant from the middle to one of the pivot bolts thereof, said means comprising a seamless metal feed pipe extending lengthwise of the spring, one or more clamps having jaws embracing the feed pipe and means separably clipping each of said clamps to one of the leaves of the spring, said clamp construction including tightening means for securing the spring mount thereof and for tightening the clamp about the feed pipe.

18. Means for lubricating the pivot bolt of a full elliptic spring of the type comprising a yoke on one of the spring elements straddling an eye on the other of the spring elments, and a pivot bolt through said yoke and eye, keyed with respect to said yoke and having a head; said means comprising a conduit bridging from the frame and extending at its outlet end to the end of said bolt, said conduit having flexibility to accommodate the movement of the pivot with respect to the frame, and a passageway through said bolt leading from said outlet to the bearing surface of said eye.

19. A unit for supplying lubricant to the pivot bearings of a full elliptic spring, said unit having a mount adapted to be affixed to the frame of the vehicle, an inverted V-shaped head, drip plugs fitting in corresponding upwardly converging bores in said head, a common inlet to said drip plugs in the apex of said head and pipes leading from said drip plugs to the pivot bearings of the spring.

20. In combination with a U-shaped yoke, a bolt fixed in the jaws of said yoke and an encircling bearing element upon said bolt between said jaws; a lubricating installation comprising a bore from the outer end of one of said jaws substantially into and longitudinally of said jaw and transverse to said bolt, an axial bore from one end of said bolt extending into said bolt to the portion thereof encircled by the bearing element and radial bores in said bolt establishing communication between said axial bore, the inner surface of said encircling element and the transverse bore through said jaw, the outer end of said axial bore being plugged, and a lubricant inlet being associated with the end of said jaw bore removed from the outer end of said jaw.

21. A full elliptic vehicle spring comprising an upper group of spring leaves, a lower group of spring leaves and pivot bearings connecting the extremities thereof, a saddle for each of said springs, a lubricant inlet at the upper saddle, a bolt through the saddle and the leaves of said upper spring, said bolt affording a passage longitudinally thereof, a groove longitudinally of the longest leaf of the upper group of spring leaves feeding the drainage from said bolt therealong to the extremity thereof and passageways supplying the drained lubricant into the pivot bearing.

22. Means for lubricating the pivot bolt of a full elliptic spring of the type comprising a yoke on one of the spring elements straddling an eye on the other spring element, and a pivot bolt through said yoke and eye, keyed with respect to said yoke and having a head; said means comprising a seamless metal feed pipe bridging from the frame and extending at the outlet end to the end of said bolt, said piping having a coiled portion at the head of said bolt, said bolt having a passageway leading lubricant from said pipe end to the bearing surface of the bolt.

23. Means for feeding lubricant to the pivot bearings of a full elliptic spring, said means comprising conduits extending from the middle part of the upper spring outward to the bearing ends thereof, each of said conduits having an upstanding inlet end, drip plugs feeding into the respective inlet ends, a fitting with one inlet and two outlets, each of which outlets is connected to one of said drip plugs, and a lubricant supply conduit feeding said inlet.

24. In a full elliptic spring of the type comprising a yoke on one of the elements therefrom straddling an eye on the other of said elements, a bolt keyed to said yoke and supporting said eye therein, means for feeding lubricant to the head of said bolt, said means comprising a flexible conduit coupled to the frame above the spring, a lubricant inlet for said conduit, the outlet terminal of said conduit extending to the end of said bolt, said bolt having a passageway therethrough leading the lubricant from said conduit to the bearing surface of said eye.

25. In a full elliptic spring of the type comprising a yoke on one of the elements therefrom straddling an eye on the other of said elements, a bolt keyed to said yoke and supporting said eye therein, means for feeding lubricant to the end of said bolt, said means comprising a flexible conduit coupled to the frame above the spring, a lubricant inlet for said conduit, the outlet terminal of said conduit extending to the end of said bolt, said bolt having a passageway therethrough leading the lubricant from said conduit to the bearing surface of said eye, the conduit extending in a drooping curve from the inlet to the outlet end thereof.

26. In combination with a U-shaped yoke, a bolt fixed in the jaws of said yoke and an encircling bearing element upon said bolt between said jaws; a lubricating installation comprising a bore from the outer end of one of said jaws substantially into and longitudinally of said jaw and transverse to said bolt, an axial bore from one end of said bolt extending into said bolt to the portion thereof encircled by the bearing element and radial bores in said bolt establishing communication between said axial bore, the inner surface of said encircling element and the transverse bore through said jaw, the outer end of said axial bore being plugged, and a lubricant inlet being associated with the end of said jaw bore removed from the outer end of said jaw, the inlet consisting of a bore tangential to bolt and extending entirely through said yoke, the outer end of which bore is plugged.

JOSEPH BIJUR.